(12) United States Patent
Monk

(10) Patent No.: US 7,860,790 B2
(45) Date of Patent: Dec. 28, 2010

(54) SYSTEMS AND METHODS FOR AUTOMATIC MIGRATION OF A CONSUMER BETWEEN FINANCIAL ACCOUNTS

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 248 days.

(21) Appl. No.: 11/757,623

(22) Filed: Jun. 4, 2007

(65) Prior Publication Data

US 2008/0301037 A1    Dec. 4, 2008

(51) Int. Cl.
*G06Q 40/00* (2006.01)

(52) U.S. Cl. .......................... 705/39; 705/35

(58) Field of Classification Search .............. 705/35, 705/39
See application file for complete search history.

(56) References Cited

U.S. PATENT DOCUMENTS

| | | | |
|---|---|---|---|
| 5,465,206 A | 11/1995 | Hilt et al. | |
| 5,477,038 A | 12/1995 | Levine et al. | |
| 5,500,513 A | 3/1996 | Langhans et al. | |
| 5,546,523 A | 8/1996 | Gatto | |
| 5,621,201 A | 4/1997 | Langhans et al. | |
| 5,692,132 A * | 11/1997 | Hogan | 705/27 |
| 5,815,665 A | 9/1998 | Teper et al. | |
| 5,845,070 A | 12/1998 | Ikudome | |
| 5,869,825 A | 2/1999 | Ziarno | |
| 6,021,943 A | 2/2000 | Chastain | |
| 6,247,129 B1 | 6/2001 | Keathley et al. | |
| 6,270,011 B1 | 8/2001 | Gottfried | |
| 6,282,522 B1 | 8/2001 | Davis et al. | |
| 6,560,581 B1 | 5/2003 | Fox et al. | |
| 6,615,190 B1 * | 9/2003 | Slater | 705/41 |
| 6,631,849 B2 | 10/2003 | Blossom | |
| 6,715,679 B1 | 4/2004 | Infosino | |
| 6,837,425 B2 | 1/2005 | Gauthier et al. | |
| 6,915,279 B2 | 7/2005 | Hogan et al. | |
| 6,920,611 B1 | 7/2005 | Spaeth et al. | |
| 6,957,334 B1 | 10/2005 | Goldstein et al. | |
| 6,999,569 B2 * | 2/2006 | Risafi et al. | 379/144.01 |
| 7,007,840 B2 | 3/2006 | Davis | |
| 7,039,611 B2 | 5/2006 | Devine | |
| 7,051,923 B2 | 5/2006 | Nguyen et al. | |
| 7,104,446 B2 | 9/2006 | Bortolin et al. | |
| 7,111,789 B2 | 9/2006 | Rajasekaran et al. | |
| 7,121,456 B2 | 10/2006 | Speath et al. | |

(Continued)

OTHER PUBLICATIONS

U.S. Appl. No. 11/757,837, Monk.

(Continued)

*Primary Examiner* — Shahid R Merchant
(74) *Attorney, Agent, or Firm* — Townsend and Townsend and Crew LLP

(57) ABSTRACT

Embodiments of the invention provide systems and methods for automatically migrating a consumer from one prepaid financial account to another prepaid financial account based on preset trigger criteria. A prepaid payment device, such as a payroll card, may be issued to the consumer and associated with a prepaid financial account. The prepaid financial account may include a profile for the consumer. The issuer of the prepaid payment device may monitor the account activity and set trigger criteria that control when the consumer is automatically migrated from the current prepaid financial account and which type of new account the consumer is migrated into.

36 Claims, 2 Drawing Sheets

U.S. PATENT DOCUMENTS

| | | |
|---|---|---|
| 7,124,937 B2 | 10/2006 | Myers et al. |
| 7,136,841 B2 | 11/2006 | Cook |
| 7,152,780 B2 | 12/2006 | Gauthier et al. |
| 7,163,153 B2 | 1/2007 | Blossom |
| 7,191,952 B2 | 3/2007 | Blossom |
| 7,243,853 B1 | 7/2007 | Levy et al. |
| 7,280,981 B2 | 10/2007 | Huang et al. |
| 2002/0111919 A1 | 8/2002 | Weller et al. |
| 2002/0174016 A1 | 11/2002 | Cuervo |
| 2002/0194138 A1 | 12/2002 | Dominguez et al. |
| 2003/0120593 A1 | 6/2003 | Bansal et al. |
| 2003/0172040 A1 | 9/2003 | Kemper et al. |
| 2003/0200184 A1 | 10/2003 | Dominguez et al. |
| 2003/0212642 A1 | 11/2003 | Weller et al. |
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0050922 A1 | 3/2004 | Gauthier et al. |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0059688 A1 | 3/2004 | Dominguez et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0220964 A1 | 11/2004 | Shiftan et al. |
| 2005/0021456 A1 | 1/2005 | Steele et al. |
| 2005/0029344 A1 | 2/2005 | Davis |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0246278 A1 | 11/2005 | Gerber et al. |
| 2005/0269396 A1 | 12/2005 | Schofield |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0006224 A1 | 1/2006 | Modi |
| 2006/0080243 A1 | 4/2006 | Kemper et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0174166 A1* | 7/2007 | Jones ......................... 705/35 |
| 2007/0198402 A1* | 8/2007 | Ruttenberg et al. ........... 705/39 |
| 2008/0082418 A1* | 4/2008 | Fordyce et al. ................ 705/14 |

OTHER PUBLICATIONS

U.S. Appl. No. 11/757,980, Monk.
U.S. Appl. No. 11/757,983, Monk.
U.S. Appl. No. 11/757,914, Monk.
U.S. Appl. No. 11/757,893, Monk.
U.S. Appl. No. 11/757,985, Monk.
International Preliminary Report on Patentability dated Dec. 17, 2009 from International Application No. PCT/US2008/065665, 6 pages.

* cited by examiner

SYSTEMS AND METHODS FOR AUTOMATIC MIGRATION OF A CONSUMER BETWEEN FINANCIAL ACCOUNTS

BACKGROUND

The present invention relates to prepaid financial accounts, such as payroll card accounts, that are preloaded with funds prior to their use by the consumer.

One example of the use of prepaid financial accounts is payroll card accounts. There are millions of employees who do not have checking accounts at banks but receive pay in the form of payroll checks. To cash those payroll checks, the employee must typically go to a check cashing service where a fee is charged to cash the payroll check. This is a particularly disadvantageous process for the affected employees.

Payroll card accounts were developed to address the problem of payroll checks. Instead of receiving a payroll check, an employee could receive a payroll card from an employer, which is periodically loaded with funds reflecting the employee's pay. The employee could then go to a bank or an ATM to withdraw funds, or could use the payroll card like a credit card to purchase goods and services directly at a merchant.

Prepaid financial accounts are also useful in other contexts. For example, a prepaid financial account can be used to control consumer spending. In one instance, a son or daughter may not be entrusted with a credit card account but, for convenience reasons, may be given a prepaid payment card linked to a prepaid financial account, which may be periodically loaded with needed funds by a parent. As such, the consumer may avail himself of the conveniences of electronic payment, but is limited to funds that already exist on the account balance.

Although the prepaid financial accounts are effective, a number of improvements could be made. For example, different types of prepaid financial accounts exist that have different account features and limitations. For example, some types of prepaid payment cards (and their associated accounts) are only capable of being reloaded with funds a limited amount of times, while other types of prepaid payment cards can be reloaded an unlimited number of times. After the set number of reloads, a consumer with a limited reload payment card must obtain another card. Similarly, some prepaid payment cards (and their associated accounts) are only capable of being used at an automatic teller machine (ATM), while other prepaid payment cards can conduct credit card transactions. Moreover, some prepaid payment cards (and their associated accounts) may be personalized to a consumer while other cards are not. Therefore, it would be desirable to automatically migrate a consumer from one prepaid financial account to another prepaid financial account based on preset criteria to, for example, anticipate the consumer's need or reward the consumer's behavior.

Embodiments of the invention address these and other problems, individually and collectively.

BRIEF SUMMARY

The present invention provides for systems and methods that enable automatic migration of a consumer from one prepaid financial account to another prepaid financial account based on preset trigger criteria. A prepaid payment device, such as a payroll card, may be issued to the consumer and associated with a prepaid financial account. The prepaid financial account may include a profile for the consumer. The issuer of the prepaid payment device may set trigger criteria that control when the consumer is automatically migrated from the current prepaid financial account and which type of new account the consumer is migrated into. The issuer may monitor the account activity and determine when the trigger criteria have been met. The consumer is then automatically migrated from the existing account to a new account, and the consumer's profile is transferred to the new account. A new portable consumer device associated with the new account is issued to the consumer. Loading of funds into the new prepaid financial account is seamless.

These and other aspects of the invention are described in further detail below.

DETAILED DESCRIPTION

Figure 1:
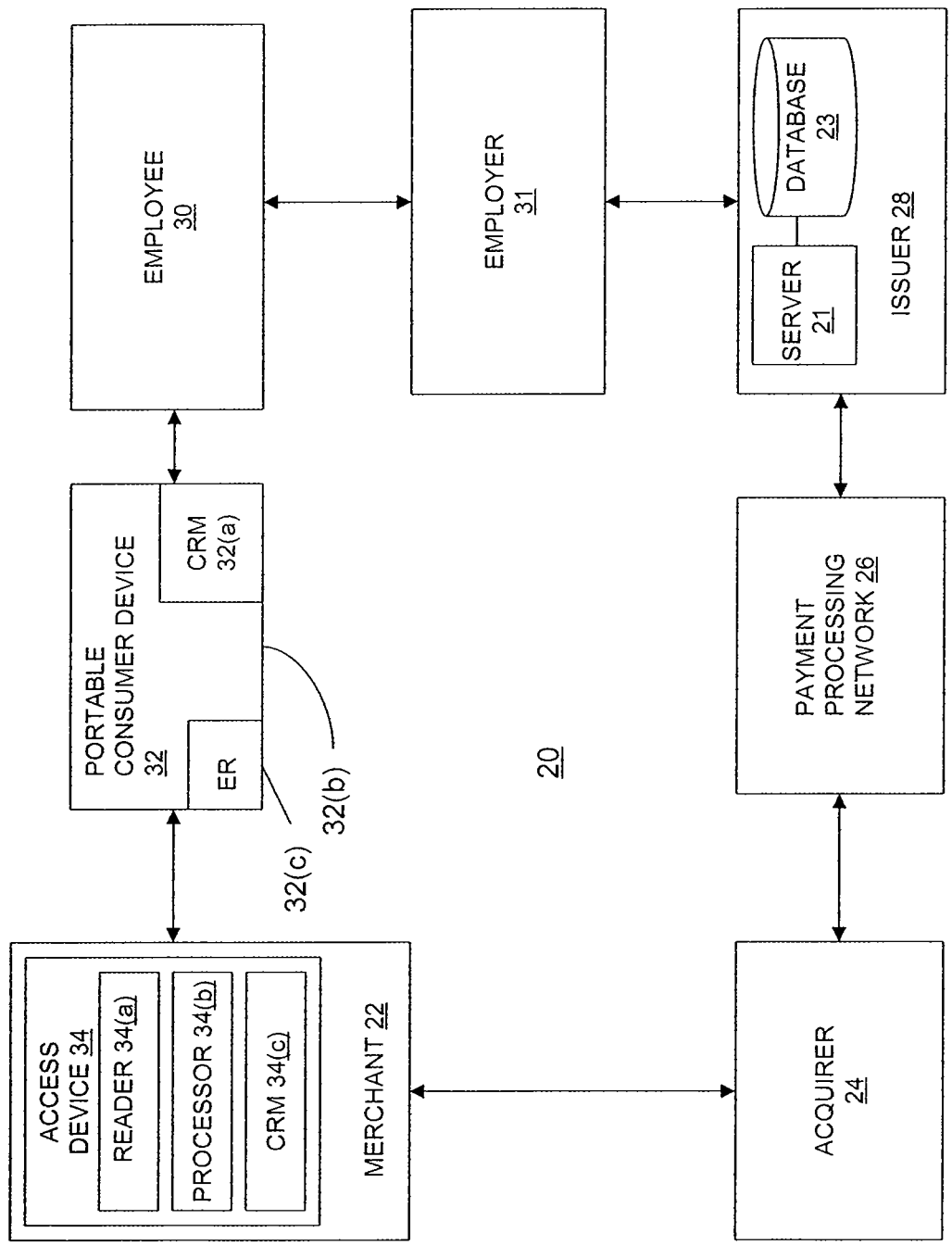
FIG. 1 shows a block diagram of a system according to an embodiment of the invention.

Embodiments of the invention provide systems and methods for automatically migrating a consumer from one prepaid financial account to another prepaid financial account based on preset trigger criteria. A prepaid payment device, such as a payroll card, may be issued to the consumer and associated with a prepaid financial account. The prepaid financial account may include a profile for the consumer that includes information such as the consumers name, address, the bank identification number (BIN) of the account, and a direct deposit account (DDA) number to which a party loading the account may direct funds. The prepaid payment device may be any suitable portable consumer device used to conduct financial transactions, such as magnetic stripe cards, RFID key fobs, and the like.

The issuer of the prepaid payment device may set criteria that control when the consumer is automatically migrated from the current prepaid financial account and which type of new account the consumer is migrated into. Criteria for the automatic migration may be based on account activity and may include, but are not limited to, the number of times the prepaid financial account has been loaded with funds, the total volume of funds that have been loaded into the account, and the total number of days that the account has been active. In some instances, the counter for these criteria is not reset when the consumer is migrated from one prepaid financial account to another and instead follow the consumer to determine future account migration status.

Prepaid financial accounts of the present invention are of a variety of types that each have different account features and limitations. For example, some account types may be disposable and may not be reloaded with funds, some account types may be limited to a set number of reloads, and other account types may enable unlimited reloading of funds. Some account types may be used only with an ATM, while other account types may be used with an ATM or to conduct credit card transactions. While the above features are given as examples, other account features and limitations are fully contemplated, such as load limits, cash back incentive programs, etc. Various features and limitations may be grouped together in a single account by an issuer to serve the needs of the consumer and/or the issuer.

Further to the varying account features described above, payment devices associated with the prepaid financial accounts of the present invention may be personalized (e.g., printed with the consumer's name) or non-personalized.

Non-personalized devices are useful for instant issue transactions where the consumer must be issued a prepaid payment card immediately (e.g., upon termination of an employee as required by some state laws).

Embodiments of the present invention enable the issuer to monitor the consumer's behavior as it relates to the preset criteria for account migration. For example, the issuer may monitor the number of reloads the account has transacted, the total dollar amount loaded, or other criteria, such as the frequency and amount of spending activity on the account and whether the account has been subject to fraud. Based on this information, the issuer determines whether the triggers for account migration have been met. In some embodiments, each type of prepaid financial account may have a different set of criteria for triggering account migration. For example, a payroll card account that is limited to three reloads may be automatically migrated to another account when three reloads have been transacted, while a payroll card account that already enables unlimited reloads may require that a certain amount money be spent using the account before the account is migrated.

When the issuer migrates the prepaid financial account of a consumer, the issuer may not require any input or request from the consumer. Once the issuer determines that the trigger criteria has been met, the issuer may determine which type of account to migrate the consumer into (i.e., which type of BIN should be assigned), create the new account number (i.e., assign the new BIN), and send the consumer a notification that the consumer's account is being migrated. The consumer's profile information is transferred to the new account such that any counters tracking the consumers behavior, biographical information, DDA numbers, etc. are copied to the new account. Since the DDA number associated with the new account will remain the same as that of the old account, the loading of funds to the new account will be seamless and will not be affected by the account migration. A new payment device may be ordered by the issuer, which may be delivered to the consumer, for example, by mail. The issuer may set the old account for closure, for example, when the new payment device is received and activated by the consumer or after a set period of time has elapsed.

In some instances, the automatic account migration provided by the present invention may be understood as an "upgrade" program in which the issuer of the prepaid financial accounts sets criteria for migrating the consumer from a "less desirable" type of account to a "more desirable" type of account that has more benefits/features and fewer limitations. For example, a consumer meeting a trigger criteria of having reloaded a payroll card account three times (i.e., meaning the consumer has been employed for three pay periods) may be upgraded from an initial account having a preset limit on reloads and that is only usable at an ATM to a new account having no limit on reloads and that is capable of conducting credit card transactions. In addition, the issuer may also send the migrated/upgraded consumer an upgraded payment device enabling the new account features and personalized with the consumer's name. As such, an employee without a bank account may be upgraded, after meeting the requite criteria, from a limited function payroll account to an unlimited re-loadable, credit card transaction enabled payroll card that essentially functions as an informal bank account. Moreover, the upgrade/migration process is automatic and reduces the requirements on the issuer's resources.

Although the above discussion helps to illustrate the present invention, it should be understood that embodiments of the present invention enable migration of the consumer from one prepaid financial account to another, which means that the consumer may also be migrated from a "more desirable" type of account to a "less desirable" type of account if the trigger criteria are met. For example, if a consumer's credit card enabled account becomes victimized by fraud, the fraud trigger may cause the issuer to initiate an automatic migration of the consumer from that account to a limited reloadable, ATM-only card. As such, the issuer is protected from further fraud, as the account number (i.e., BIN) associated with the consumer's account must now change frequently as the consumer must obtain a new account when the reload limit has been met. Moreover, the ATM-only account only enables the consumer to engage in PIN verified transactions, which is less prone to fraud than credit card transactions.

In other instances, the consumer may simply be migrated to another account of the same type bearing a different account number (i.e., BIN), although the consumer may now be issued a personalized payment device, if a non-personalized device was initially issued. For example, a payroll card account that is limited to three reloads may be automatically migrated to another account of the same type when three reloads have been transacted so as to enable the employee to continue receiving pay.

In some embodiments, the amount of "upgrade" to be received by the consumer may be determined by how many of the preset criteria are met and to what extent. That is, the types of accounts may be assigned relative values and the issuer may determine how many levels to "promote" the consumer's account. For example, a consumer meeting more of the preset criteria (e.g., having reloaded a number of times, spent a certain amount of money from the account) or meeting the criteria to a higher level (e.g., having spent over $1,000 rather than over $500 from the account) may be migrated to a "more desirable" account than a consumer meeting only one of the preset criteria and/or only meeting the criteria at the lowest set level.

Although the specific examples that are described above and below relate to prepaid financial accounts in which funds are loaded into the account prior to expenditure by the consumer, the concepts of the present invention are fully applicable to other types of financial accounts, such as credit card accounts, bank accounts, personal line of credit accounts, etc. As such, the issuer of such financial accounts may determine preset criteria that automatically trigger the migration of the consumer from one type of account to another without requiring any input from the consumer. For example, the issuer may automatically upgrade the consumer from a low credit limit, high interest rate credit card account into a high credit limit, low interest rate account, issue a new credit card to the consumer having the new account number, and set the old account for closure.

FIG. 1 illustrates a system 20 that can be used in an embodiment of the invention directed to payroll card accounts. The system 20 shown in FIG. 1 illustrates one merchant, one acquirer, one employee, one employer, one portable consumer device (e.g., payroll card device), one issuer, and one payment processing network for simplicity of illustration. It is understood that embodiments of the invention may have more or less components than are shown in FIG. 1.

The system 20 includes an employer 31 that may be in operative communication with the issuer 28 of the payroll card accounts. The employer 31 may give the employee 30 a portable consumer device 32 (e.g., a payroll card device) associated with a payroll card account in exchange for work performed, or may provide the portable consumer device 32 with additional value in embodiments where the account is reloadable. The employer 30 may have an account with the issuer 28 and may direct the issuer to load additional value into the payroll card account associated with the portable consumer device 32.

The issuer 28 may have or operate a server computer 21 and a database 23. As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. A server computer services the requests of one or more client computers. The database 23 may contain employer account information, portable consumer device identification data, pin data, and account data, and other information.

The monetary values associated with the payroll card accounts, the employee's profile information associated with the payroll card accounts, the trigger criteria associated with each type of payroll card account, may all be stored in database 23. The portable consumer devices may or may not store data representing the monetary values associated with the accounts. For example, the portable consumer device 32 may simply comprise an identification number (e.g., an account number). This account number may be stored in the database 23 with the monetary value (e.g., $500) associated with the portable consumer device 32. In this example, data representing the monetary value (e.g., $500) would not be stored on the portable consumer device 32. In other embodiments, data representing the monetary value associated with the portable consumer device 32 could be stored in a computer readable medium 32(*a*) of the portable consumer device 32.

The portable consumer device 32 may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like.

The portable consumer device 32 may comprise a computer readable medium 32(*a*) and a body 32(*b*). The computer readable medium 32(*a*) may be on the body 32(*b*). The body 32(*b*) may in the form a plastic substrate, housing, or other structure. The computer readable medium 32(*a*) may be a memory that stores data and may be in any suitable form. Exemplary computer readable media 32(*a*) may be in any suitable form including a magnetic stripe, a memory chip, etc. If the portable consumer device 32 is in the form of a card, it may have an embossed region ER 32(*c*) which is embossed with an account number and optionally the employee's name. The computer readable medium 32(*a*) may electronically store the account number as well as other data such as PIN data.

The system 20 also includes a merchant 22 and an acquirer 24 associated with the merchant 22. The merchant 22 may have an account at the acquirer 24, and therefore may be affiliated with the acquirer 24. An issuer 28 may be in operative communication with the acquirer 24 via a payment processing network 26. The acquirer 24 is typically a bank that has a merchant account. The issuer 28 may also be a bank, but could also be business entity such as a retail store. Some entities are both acquirers and issuers, and embodiments of the invention include such entities. Merchant 22 may have an account at the acquirer 24.

The merchant 22 may also have, or may receive communications from, an access device 34 that can interact with the portable consumer device 32. In FIG. 1, the access device 34 is located at the merchant 22. However, it could be located at any other suitable location in other embodiments of the invention. Suitable merchants may include department stores, gas stations, drug stores, grocery stores, etc.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. Such access devices may send or receive data from the portable consumer device 32 using any suitable contact or contactless mode of operation.

If the access device 34 is a point of sale terminal, any suitable point of sale terminal may include a reader 34(*a*), a processor 34(*b*) and a computer readable medium 34(*c*). The reader 34(*b*) may include any suitable contact or contactless mode of operation. For example, exemplary card readers can include RF (radio frequency) antennas, magnetic stripe readers, etc. to interact with the portable consumer device 32.

The payment processing network 26 may include data processing subsystems, networks, and operations used to support and deliver authorization services, exception file services, and clearing and settlement services. Payment processing network 26 may include a network such as VisaNet or may be a separate prepaid processing platform (PPP). In some instances, VisaNet may refer transactions involving prepaid financial accounts to the separate PPP for an authorization decision. Payment processing networks 26 may be able to able to process credit card transactions, debit card transactions, and other types of commercial transactions. The payment processing network 26 may use any suitable wired or wireless network, including the Internet.

Using the above described system, payroll card accounts may be loaded by an issuer 28 upon instruction by the employer 31, and the employee 30 may use the issued portable consumer device 32 to enter into commercial transactions with a merchant 22 via acquirer 24 and payment processing network 26.

Some exemplary embodiments of the invention can be described with reference the flowchart in FIG. 2 and the system in FIG. 1.

Figure 2:
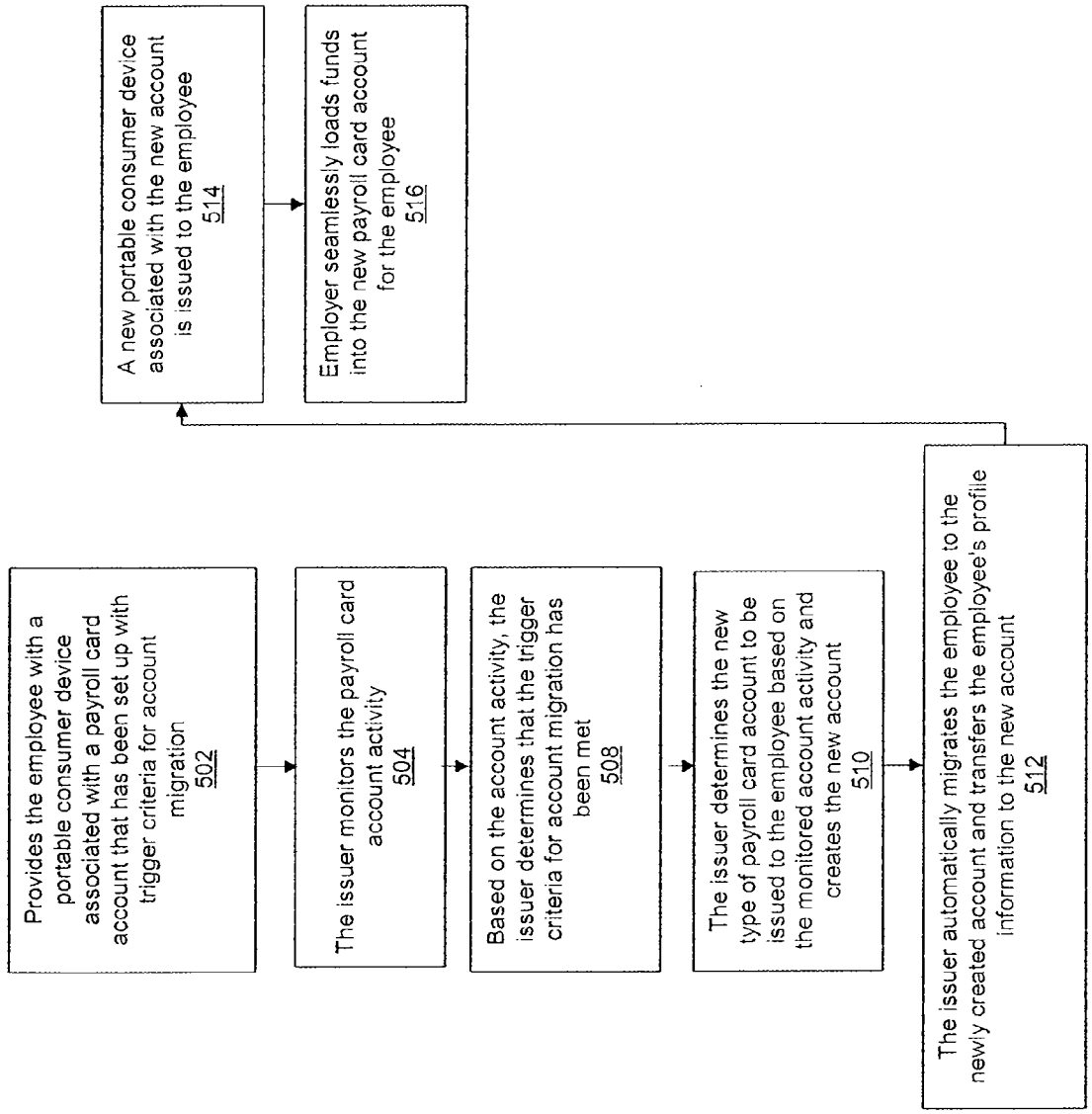
FIG. 2 shows a flowchart illustrating a method according to an embodiment of the invention.

As shown in FIG. 2, an employer 31 provides the employee 30 with a portable consumer device 32 (e.g., a payroll card) associated with a payroll card account that has been set up with trigger criteria for account migration (step 502). The portable consumer device 32 may have been created by the issuer 28 or provisioned by the issuer 28. The employee may then utilize the portable consumer device 32 to transact business with merchants 22. The payroll card account associated with portable consumer device 32 may be periodically reloaded by employer 31. At step 504, the payroll card account activity is monitored by the issuer 28. Based on the account activity, the issuer determines that the trigger criteria for account migration has been met at step 506. At step 508, the issuer 28 then determines the new type of payroll card account to be issued to the employee 30 based on the monitored account activity and creates the new account (which is assigned a new account number of the appropriate BIN type). At step 510, the issuer automatically migrates the employee's payroll account to the newly created account and transfers the employee's profile information to the new account. The employee's profile information includes at least the DDA number used by the employer 31 to direct funds into the employee's payroll card account. At step 512, a new portable consumer device 32 associated with the new account is issued to the employee 30, which may be embossed with the employee's name in region 32(c). The old payroll card account may then be closed. Finally, at step 514, employer 31 seamlessly loads funds into the new payroll card account, for example, using the DDA number migrated from the old payroll card account.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of automatically migrating a consumer between prepaid financial accounts, the method comprising:
    issuing a first prepaid financial account to a consumer, wherein the first prepaid financial account is associated, using a server computer, with a profile of the consumer;
    setting, using the server computer, trigger criteria for migrating the consumer from the first prepaid financial account to a second prepaid financial account, wherein the trigger criteria is based on account activity of the first prepaid financial account;
    monitoring, using the server computer, the account activity of the first prepaid financial account to determine when the trigger criteria has been met;
    automatically issuing the second prepaid financial account to the consumer when the trigger criteria has been met, and associating, using the server computer, the profile with the second prepaid financial account, wherein associating the profile with the second prepaid financial account comprises associating at least a direct deposit account number of the consumer with the second prepaid financial account; and
    setting, using the server computer, the first prepaid financial account for closure, wherein the trigger criteria includes a fraud trigger and wherein after the fraud trigger has been met, the consumer is migrated to the second prepaid financial account.

2. The method of claim 1 wherein issuing a first and second prepaid financial accounts comprises issuing payroll card accounts configured to be loaded by an employer.

3. The method of claim 1 further comprising loading funds into the second prepaid financial account using the direct deposit account number.

4. The method of claim 1 wherein the profile comprises the consumer's name and a direct deposit account number associated with the consumer.

5. The method of claim 1 wherein the first and second prepaid financial accounts have different account numbers.

6. The method of claim 1 further comprising issuing a new portable consumer device associated with the second prepaid financial account to the consumer, wherein the new portable consumer device is embossed with a new account number different than that of the first prepaid financial account and the consumer's name.

7. The method of claim 1 further comprising determining a type of the second prepaid financial account based on a type of the first prepaid financial account.

8. The method of claim 1 further comprising determining a type of the second prepaid financial account based on a number of trigger criteria that have been met.

9. The method of claim 1 wherein the first prepaid financial account is of a first type and the second prepaid financial account is of a second type, wherein each type of account includes a different set of features.

10. The method of claim 9 wherein the first type of account can only be reloaded the set number of times and the second type of account is capable of unlimited reloads.

11. The method of claim 9 wherein the first type of account can only be used at an Automated Teller Machine and the second type of account can also be used to conduct credit card transactions.

12. The method of claim 1 wherein the first prepaid financial account is an account that can only be reloaded a set number of times and the trigger criteria further includes reloading the account the set number of times.

13. The method of claim 1 wherein the trigger criteria further includes a number of times the first prepaid financial account has been loaded, an aggregate amount of funds loaded, a frequency of spending activity, and an amount of spending activity.

14. The method of claim 9 wherein the trigger criteria comprise a fraud alert and the second type of account has fraud prevention features.

15. The method of claim 14 wherein the fraud prevention features comprise enabling the account to transact only Personal Identification Number verified transactions.

16. The method of claim 14 wherein the fraud prevention features comprise limiting a number of reloads the account is allowed to transact.

17. The method of claim 1 wherein the trigger criteria further includes a total number of days that the account has been active.

18. The method of claim 9 wherein the first type of account is a credit card enabled account and the second type of account can only be reloaded a set number of times.

19. The method of claim 1 wherein the second prepaid financial account is configured to be loaded by an employer using the direct deposit account number.

20. The method of claim 1 further comprising notifying the consumer that the first prepaid financial account is being migrated.

21. The method of claim 1 wherein setting the first prepaid financial account for closure occurs after a new payment device associated with the second prepaid financial account is activated by the consumer.

22. The method of claim 1 wherein setting the first prepaid financial account for closure occurs after a set period of time has elapsed.

23. The method of claim 1 wherein the second prepaid financial account includes more benefits and fewer limitations than the first prepaid financial account.

24. The method of claim 1 wherein the second prepaid financial account includes more limitations than the first prepaid financial account.

25. The method of claim 1 wherein if the fraud trigger has been met, the consumer is required to verify with a Personal Identification Number each transaction conducted using the second prepaid financial account.

26. The method of claim 1 wherein the profile comprises counters tracking consumer behavior.

27. The method of claim 1 wherein the first prepaid financial account comprises a limited function payroll account, and the second prepaid financial account comprises an unlimited re-loadable payroll account.

28. The method of claim 13 wherein the second prepaid account comprises an account type, wherein the account type is assigned to the consumer based upon the number of trigger criteria the first prepaid financial account has met.

29. A method of automatically migrating a consumer between prepaid financial accounts, the method comprising:
issuing a first prepaid financial account to a consumer, wherein the first prepaid financial account is associated, using a server computer, with a profile of the consumer;
setting, using a server computer, trigger criteria for migrating the consumer from the first prepaid financial account, wherein the trigger criteria is based on the first prepaid financial account activity comprising reloading the first prepaid financial account a set number of times;
monitoring, using a server computer, the first prepaid financial account activity to determine when the first prepaid financial account has been reloaded the set number of times, so that the trigger criteria has been met;
automatically issuing a second prepaid financial account to the consumer when the trigger criteria has been met and migrating, using a server computer, the profile of the consumer and funds loaded on the first prepaid financial account to the second prepaid financial account; and
determining, using a server computer, a type of the second prepaid financial account by comparing the first prepaid financial account activity to numerical levels established in at least one trigger criterion.

30. The method of claim 29 wherein the profile comprises counters tracking consumer behavior.

31. The method of claim 29 wherein the set number of times comprises three reloads.

32. A non-transitory computer readable medium storing a computer program containing instructions thereon for instructing a computer to perform the steps of:
issuing a first prepaid financial account to a consumer, wherein the first prepaid financial account is associated with a profile of the consumer;
setting trigger criteria for migrating the consumer from the first prepaid financial account to a second prepaid financial account, wherein the trigger criteria is based on account activity of the first prepaid financial account and includes a fraud trigger; monitoring the account activity of the first prepaid financial account to determine when the fraud trigger has been met;
automatically issuing the second prepaid financial account to the consumer when the fraud trigger has been met and associating the profile with the second prepaid financial account, wherein associating the profile with the second prepaid financial account comprises associating at least a direct deposit account number of the consumer with the second prepaid financial account; and
setting, using the server computer, the first prepaid financial account for closure.

33. A server computer comprising:
a processor; and
a computer readable medium coupled to the processor, storing a computer program containing instructions thereon for instructing the server computer to perform the steps of:
issuing a first prepaid financial account to a consumer, wherein the first prepaid financial account is associated with a profile of the consumer;
setting trigger criteria for migrating the consumer from the first prepaid financial account to a second prepaid financial account, wherein the trigger criteria is based on account activity of the first prepaid financial account and wherein the trigger criteria comprises reloading the first prepaid financial account a set number of times;
monitoring the account activity of the first prepaid financial account to determine when the first prepaid financial account has been reloaded the set number of times, so that the trigger criteria has been met;
automatically issuing the second prepaid financial account to the consumer when the trigger criteria has been met and associating the profile with the second prepaid financial account, wherein associating the profile with the second prepaid financial account comprises associating at least a direct deposit account number of the consumer with the second prepaid financial account and migrating funds loaded on the first prepaid financial account to the second prepaid financial account; and
setting, using the server computer, the first prepaid financial account for closure.

34. A method of automatically migrating a consumer between prepaid financial accounts, the method comprising:
issuing a first prepaid financial account to a consumer, wherein the first prepaid financial account is associated, using a server computer, with a profile of the consumer;
setting, using the server computer, trigger criteria for migrating the consumer from the first prepaid financial account to a second prepaid financial account, wherein the trigger criteria is based on account activity of the first prepaid financial account;
monitoring, using the server computer, the account activity of the first prepaid financial account to determine when the trigger criteria has been met;
automatically issuing the second prepaid financial account to the consumer when the trigger criteria has been met, and associating, using the server computer, the profile with the second prepaid financial account, wherein associating the profile with the second prepaid financial account comprises associating at least a direct deposit account number of the consumer with the second prepaid financial account; and
setting, using the server computer, the first prepaid financial account for closure, wherein the trigger criteria includes a fraud trigger and wherein if the fraud trigger has been met, the second prepaid financial account is associated with a limited reloadable, Automated Teller Machine-only card.

35. A system comprising:
a database for storing account information; and
a server computer comprising a processor and a computer readable medium coupled to the processor, storing a computer program containing instructions thereon for instructing the server computer to perform:
issuing a first prepaid financial account to a consumer, wherein the first prepaid financial account is associated with a profile of the consumer;
setting trigger criteria for migrating the consumer from the first prepaid financial account to a second prepaid financial account, wherein the trigger criteria is based on account activity of the first prepaid financial account;
monitoring the account activity of the first prepaid financial account to determine when the trigger criteria has been met;
automatically issuing the second prepaid financial account to the consumer when the trigger criteria has been met and associating the profile with the second prepaid financial account, wherein associating the profile with the second prepaid financial account comprises associating at least a direct deposit account number of the consumer with the second prepaid financial account; and
setting, using the server computer, the first prepaid financial account for closure, wherein the trigger criteria includes a fraud trigger and wherein after the fraud trigger has been met, the consumer is migrated to the second prepaid financial account.

36. The system of claim 35 further comprising a portable consumer device.

* * * * *